United States Patent [19]
Fisher

[11] 3,783,548
[45] Jan. 8, 1974

[54] FISH CATCH KEEPER
[76] Inventor: Frank W. Fisher, 27141 13th St., Highland, Calif. 92346
[22] Filed: July 5, 1972
[21] Appl. No.: 269,282

[52] U.S. Cl. .................... 43/21.2, 224/7 R, 248/42
[51] Int. Cl. ...................... A01k 65/00, A01k 97/10
[58] Field of Search ..................... 43/21.2, 54.5 A; 248/42, 229; 224/7 R

[56] References Cited
UNITED STATES PATENTS
| | | | |
|---|---|---|---|
| 2,563,160 | 8/1951 | Damon | 224/7 R |
| 2,804,716 | 9/1957 | Adkison | 43/54.5 A |
| 2,693,332 | 11/1954 | Albert | 248/42 |
| 2,367,588 | 1/1945 | Kruse | 248/42 X |
| 1,992,165 | 2/1935 | Bardon | 248/40 |

Primary Examiner—Louis G. Mancene
Assistant Examiner—Daniel J. Leach

[57] ABSTRACT

An accessory for water storage of fish caught from a small boat, the device comprising a fish safety pin racking rod fastened to the gunwale and extending outward therefrom with a horizontal portion for racking a multiplicity of pins, the rod arching upwardly and then pointing downwardly at its outer end to retain said pins racked on said horizontal portion, a chain long enough to reach the water being attached to the end of the rod and terminating in a keeper disc preventing the escape of fish holding safety pins threaded on said chain. The rod is optionally welded to a clamp for attachment to the boat gunwale or provided with an eye insertable in a secondary fishing rod holding clamp which in turn has a primary clamp for securing the same to a boat gunwale.

6 Claims, 4 Drawing Figures

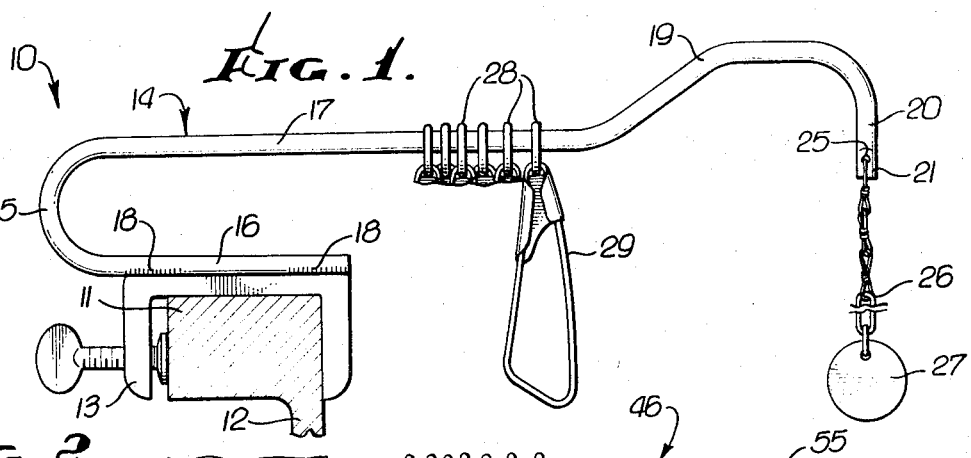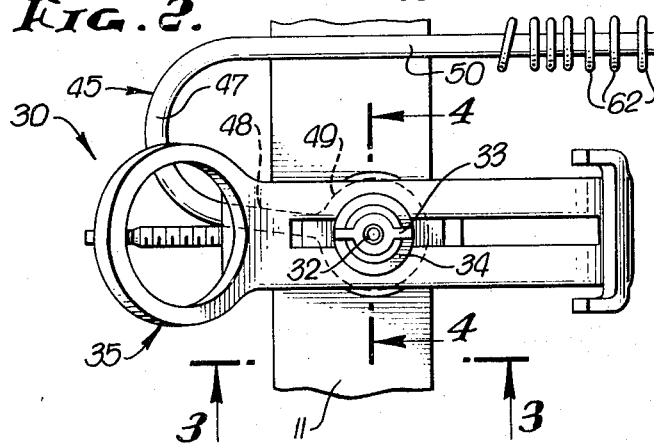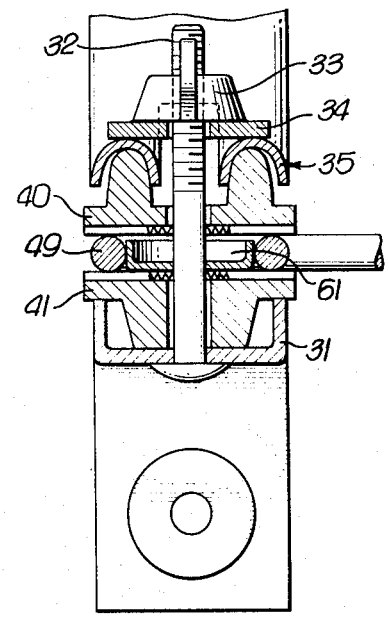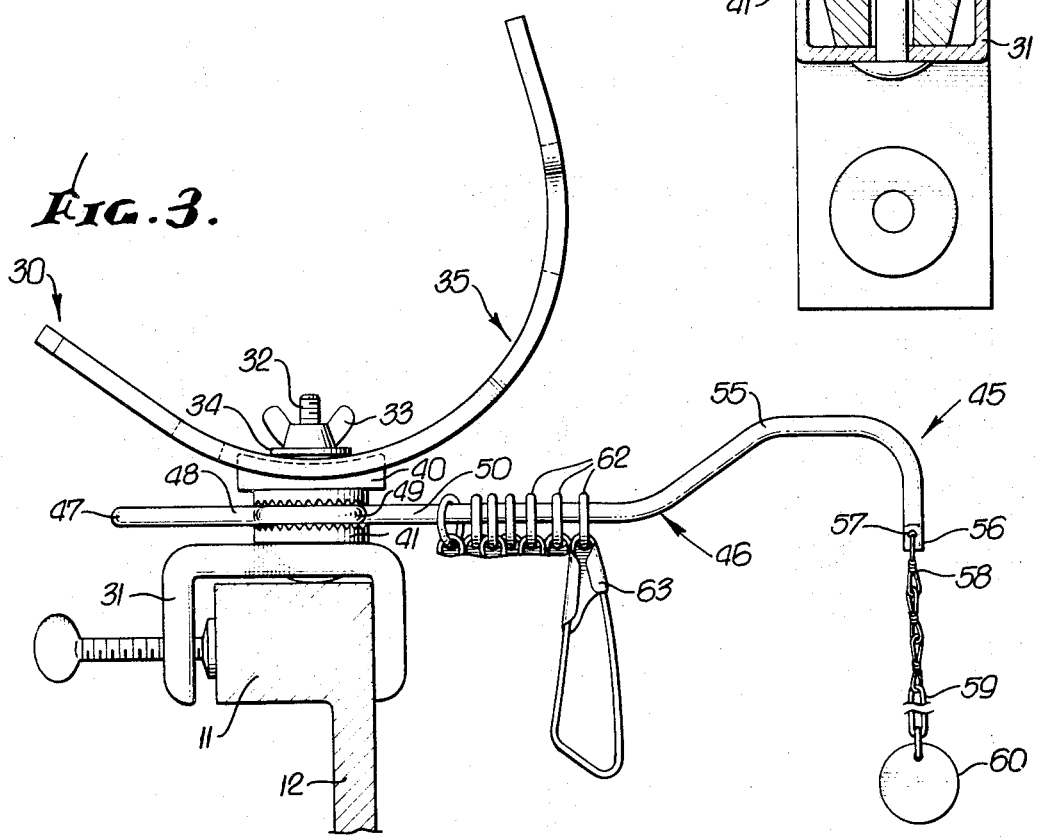

FISH CATCH KEEPER

SUMMARY OF THE INVENTION

It is a common practice among those who fish from small boats to store the catch, as it accumulates, on safety pins, each of which holds one fish and has a heavy ring enabling it to be strung with the other pins on a fish ducking chain suspended from the boat, said chain having a pin retaining disc at its lower end and being long enough so that all the catch is kept submerged in the water until the fisherman heads for home.

About a generation ago a rod was devised for racking the pin rings, with the catch ducking chain attached to the rod end so that the pins are stored until needed and the adding of each pinned fish to the ducking chain is easily accomplished just by running the pin ring off the end of the rod. This invention is shown in U.S. Pat. No. 2,563,160 but does not appear to have found favor with small boat fishermen. One of its defects is that the pins are racked inside the boat and are thus not readily accessible to an angler leaning over the gunwale with his hands in the water which is generally his position when retrieving the hook from a fish, and thus preparing to pin the fish.

It is an object of the present invention to provide a fish safety pin racking rod for use in fish catch keepers which will rack these pins outwardly from the boat where these will be immediately available when and where they are needed, yet will guard against these pins being accidentally run off the rod onto the fish ducking chain without their carrying a fish.

Another object of the invention is to provide such a fish catch keeper which does not require a special clamp for securing it to a boat gunwale but which is readily associated with and supported by and jointly used in fishing with a novel fishing rod holder which contains within itself a means for clamping the same on a boat gunwale.

BRIEF DESCRIPTION OF THE DRAWINGS

FIG. 1 is a diagrammatic cross sectional view of the gunwale of a small boat illustrating a preferred embodiment of the fish catch keeper of the invention clamped thereto.

FIG. 2 is a plan view of a modified form of the invention and showing it associated with and incorporated in a novel fishing rod holder having within itself a means for clamping the same on a small boat gunwale and showing it so clamped.

FIG. 3 is a cross sectional view taken on the line 3—3 of FIG. 2.

FIG. 4 is an enlarged fragmentary cross sectional view taken on the line 4—4 of FIG. 2.

DETAILED DESCRIPTION OF THE PREFERRED EMBODIMENT

Referring first to FIG. 1, a fish catch keeper 10 is here shown which is mounted on the gunwale 11 of a small boat 12 by means of a screw clamp 13. The catch keeper includes a fish safety pin racking rod 14 which is bent reversely on itself at 15 to divide an inner end portion 16 from a middle pin racking portion 17 with said portions in parallel relation and held in horizontal vertically superimposed relation by the welding at 18 of the inner end portion 16 to the clamp 13. The rod 14 terminates forwardly in a steeply upwardly arched and then vertically downward pointing front rod portion 19 the extremity 20 of which is flattened at 21 and provided with an aperture 25 for securing thereto a fish catch ducking chain 26 having a keeper disc 27 on its lower end.

Held captive on the rod 14 and chain 26 are a series of rings 28, each of which is permanently incorporated with a fish holding safety pin 29. The rings 28 readily slide along the rod 14 and chain 26 but, prior to the pins 29 being placed in use by attaching the pins individually and successively to the fishes caught, the pin rings 28 are trapped on the horizontal racking rod portion 17 by the upwardly arched front rod portion 19, as shown in FIG. 1.

While the pins 29 may be optionally stored hanging "inboard" from the rod bend 15, it is one of the special advantages of the present invention that it provides a means for racking the pins 29 "outboard" or over the water where it is preferable to apply a caught fish to a pin. The pin, of course, may be run off of the rod 14 onto the chain 26 before spearing a fish with the pin.

It is to be noted that in the preferred form of the invention shown in FIG. 1, the various portions 15, 16, 17 and 19 of the fish safety pin racking rod 14 lie in the same vertical plane. This is because a simple gunwale clamp 13 is incorporated into the rod 14 by welding inner rod end portion 16 to the top face of the clamp.

It is not essential that the present invention be provided with its own gunwale clamp, however. There are other fisherman's accessories equipped with such clamps with which a simplified form of the present invention may be combined with the same clamp supporting both devices.

For instance, FIGS. 2, 3 and 4 of the drawings illustrate a fishing rod holder 30 including a gunwale clamp 31 mounting thereon a vertically extending bolt 32 having a wing nut 33 and washer 34 which vertically clamps together an arcuate fishing rod support 35 and radially serrated clutch elements 40 and 41 so as to adjustably lock support 35 on the gunwale clamp 31 in various selected positions.

To incorporate the present invention with the fishing rod holder 30, a fish catch keeper 45 is provided having a safety pin racking rod 46 having a bend 47 lying in a horizontal plane and dividing rod 46 into an inner end portion 48, in the tip of which an eye 49 is bent, and a straight middle portion 50, which is co-planar horizontally with bend 47 and eye 49. Portion 50 merges with front rod portion 55 which is upwardly arched and then bent to point downwardly in identically the same manner as shown in FIG. 1 and above described for front portion 19 of rod 14. The front tip of rod portion 55 is flattened at 56 and provided with an aperture 57 for receiving a tie wire 58 connecting said rod to a fish catch ducking chain 59 having a keeper disc 60. Pressed within the eye 49 is a sheet metal cup washer 61 which centralizes the eye 49 on bolt 32 when said eye is assembled on the latter between clutch elements 40 and 41. When nut 33 is then tightened, the fish catch keeper 45 is supported on gunwale clamp 31 as shown in FIGS. 2, 3 and 4. Held captive on the rod 46 and chain 59 are a series of rings 62 from which fish safety pins 63 are individually suspended, these rings and pins being identical with rings 28 and pins 29 described above.

It may be readily perceived by an examination of FIGS. 2, 3 and 4 that the fishing rod holder 30 may be optionally used either by itself or in conjunction with the fish catch keeper 45 of the invention, depending on whether or not the eye 49 of the latter is interposed between the clutch elements 40 and 41. It is further evident that when the two devices are so united each is free to perform its particular function without interference from the other.

I claim:

1. In a fish catch keeper, the combination of:
a fish holding safety pin racking rod;
means on an inner end portion of said rod for use in fastening said rod to a boat gunwale, said rod being reversely bent from said inner end portion to form a relatively straight horizontal safety pin racking portion extending outwardly horizontally over said gunwale, and terminating in an outer end portion which is first upwardly arched from said horizontal portion and then is bent to point downwardly;
said rod having at its outer end, a means for connecting thereto a fish catch ducking chain.

2. A combination as recited in claim 1 wherein said rod fastening means comprises a horizontal inner rod end portion; and
a gunwale clamp to which said inner rod end portion is welded.

3. A combination as recited in claim 1 wherein said racking rod fastening means comprises an eye bent in said inner rod end portion.

4. A combination as recited in claim 3 wherein said reverse bend of said inner rod end portion lies in the same horizontal plane as said safety pin racking rod portion, and wherein
said eye also lies in said horizontal plane.

5. A combination as recited in claim 4 including a gunwale clamp; and
bolt clamp means mounted on said clamp and extending vertically upwardly therefrom when said clamp is applied to a gunwale, said bolt clamp means penetrating and securing said eye rigidly to said clamp.

6. A combination as recited in claim 5 including:
a fishing rod holder adjustably secured to said clamp by said bolt clamp means.

* * * * *